(12) United States Patent
Horie et al.

(10) Patent No.: US 10,225,448 B2
(45) Date of Patent: Mar. 5, 2019

(54) IMAGE ACQUISITION SYSTEM (71) Applicant: Olympus Corporation, Hachioji-shi, Tokyo (JP)

(72) Inventors: Takuji Horie, Kanagawa (JP); Takashi Miyoshi, Kanagawa (JP); Kensuke Ishii, Tokyo (JP); Arata Shinozaki, Tokyo (JP); Saori Matsumoto, Tokyo (JP); Nobuyuki Watanabe, Kanagawa (JP); Hiroyuki Fukuda, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/826,599

(22) Filed: Nov. 29, 2017

(65) Prior Publication Data

US 2018/0084169 A1 Mar. 22, 2018

Related U.S. Application Data

(63) Continuation of application No. PCT/JP2015/066243, filed on Jun. 4, 2015.

(51) Int. Cl.
*H04N 5/225* (2006.01)
*H04N 5/232* (2006.01)
(Continued)

(52) U.S. Cl.
CPC ............ *H04N 5/2256* (2013.01); *G02B 5/10* (2013.01); *G03B 15/06* (2013.01); *G03B 29/00* (2013.01);
(Continued)

(58) Field of Classification Search
None
See application file for complete search history.

(56) References Cited

U.S. PATENT DOCUMENTS 2,813,456 A * 11/1957 Ostrov ............... G03B 27/323
248/150
3,696,720 A * 10/1972 Vinson ............... G01R 13/204
250/549
(Continued)

FOREIGN PATENT DOCUMENTS

JP 11-223851 8/1999
JP 2005-158490 6/2005
(Continued)

OTHER PUBLICATIONS

International Search Report ("ISR") to corresponding International Application No. PCT/JP2015/066243, dated Aug. 25, 2015 (1 pg.), with translation (1 pg.).

*Primary Examiner* — William B Perkey
(74) *Attorney, Agent, or Firm* — John C. Pokotylo; Pokotylo Patent Services (57) ABSTRACT

Provided is an image acquisition system according to the present invention includes: a display device that has a display surface on which an image is displayed; a dome-shaped reflective member that is disposed so as to cover at least a part of the display surface of the display device, that includes a reflective surface reflecting light from the display surface, on an inner surface thereof, and has a through-hole that passes between an interior and an exterior; and a photographing device that photographs light radiated from the display surface via the through-hole, while a subject is disposed at a position between the reflective member and the display surface.

6 Claims, 8 Drawing Sheets

(51) Int. Cl.
  *G02B 5/10* (2006.01)
  *G03B 15/06* (2006.01)
  *G03B 29/00* (2006.01)

(52) U.S. Cl.
  CPC ....... *H04N 5/2254* (2013.01); *H04N 5/23203* (2013.01); *H04N 5/23293* (2013.01)

(56) References Cited

U.S. PATENT DOCUMENTS

| | | | | |
|---|---|---|---|---|
| 4,786,926 A * | 11/1988 | Hurvitz | ............... | G03B 17/48 355/21 |
| 5,285,226 A * | 2/1994 | Frosig | ............... | G03B 27/323 248/174 |
| 5,604,550 A * | 2/1997 | White | ............... | G01N 21/8806 348/E5.029 |
| 5,802,413 A * | 9/1998 | Stephenson | ............ | G03B 17/50 348/E5.024 |
| 5,826,122 A * | 10/1998 | Shekel | ............... | G03B 15/003 396/429 |
| 6,154,616 A * | 11/2000 | Saito | ............... | G03B 17/24 355/40 |
| 2018/0084169 A1* | 3/2018 | Horie | ............... | G02B 5/10 |

FOREIGN PATENT DOCUMENTS

| | | |
|---|---|---|
| JP | 2007-067966 | 3/2007 |
| JP | 2010-276433 | 12/2010 |
| JP | 5258387 | 8/2013 |

* cited by examiner

IMAGE ACQUISITION SYSTEM

CROSS-REFERENCE TO RELATED APPLICATIONS

This is a continuation of International Application PCT/JP2015/066243, with an international filing date of Jun. 4, 2015, which is hereby incorporated by reference herein in its entirety.

TECHNICAL FIELD

The present invention relates to an image acquisition system.

BACKGROUND ART

There is known a spatial presentation system that photographs a show window space, which contains a projection space to be spatially presented by projecting an image to a display item in the show window space by a projector, by a camera disposed near the viewpoint of a user who watches the display item, and that generates the image to be projected by the projector (for example, see PTL 1).

CITATION LIST

Patent Literature

{PTL 1}
The Publication of Japanese Patent No. 5258387

SUMMARY OF INVENTION

An aspect of the present invention is directed to an image acquisition system including: a display device that includes a display surface on which an image is displayed; a dome-shaped reflective member that is disposed so as to cover at least a part of the display surface of the display device, that includes a reflective surface reflecting light from the display surface, on an inner surface, and that has a through-hole that passes between an interior and an exterior; and a photographing device that photographs light radiated from the display surface via the through-hole, while a subject is disposed at a position between the reflective member and the display surface.

DESCRIPTION OF EMBODIMENTS

Hereinafter, an image acquisition system 1 according to an embodiment of the present invention will be described with reference to the drawings.

Figure 1:
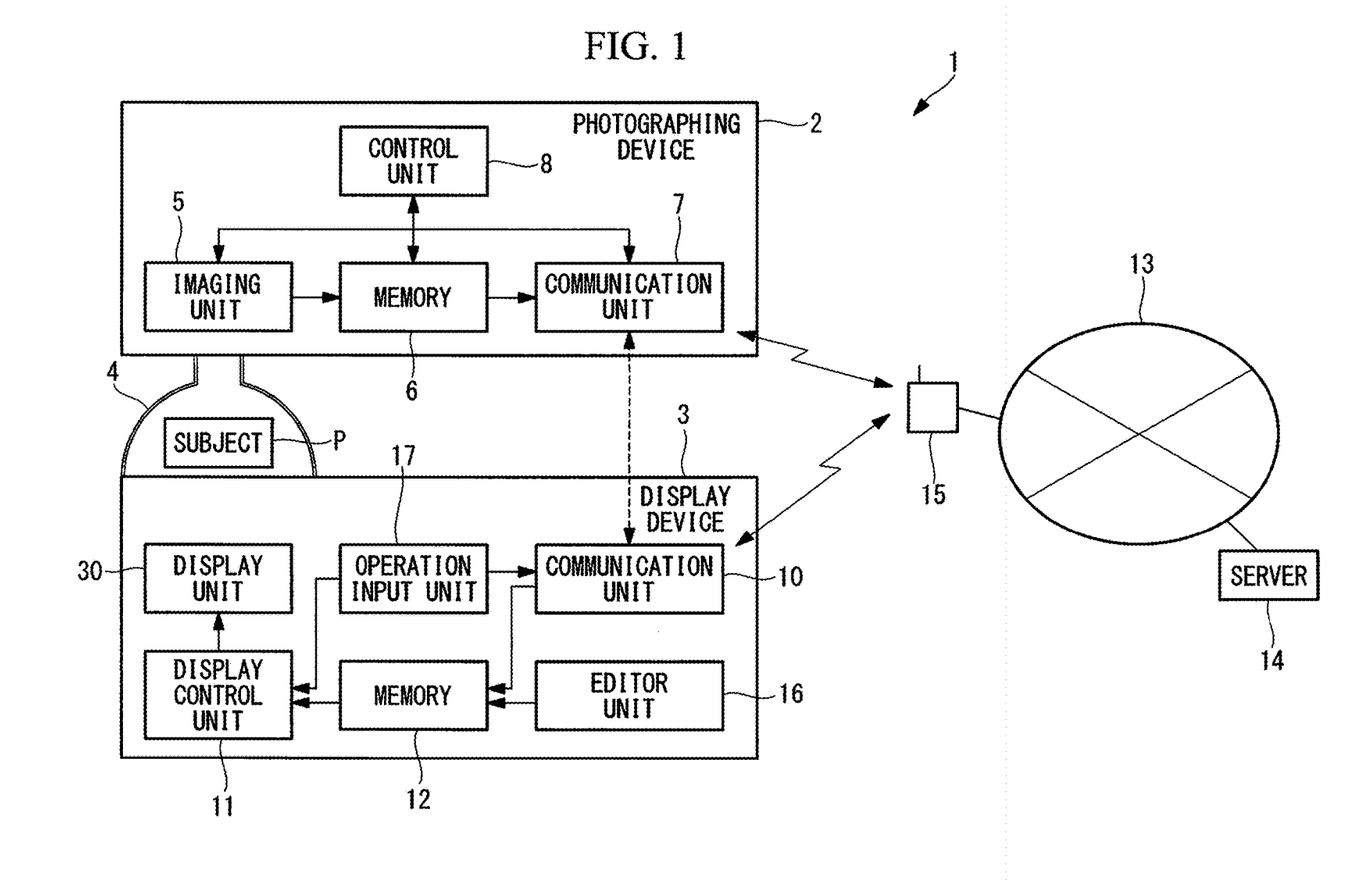
FIG. 1 is an overall configuration diagram showing an image acquisition system according to an embodiment of the present invention.
Figure 2:
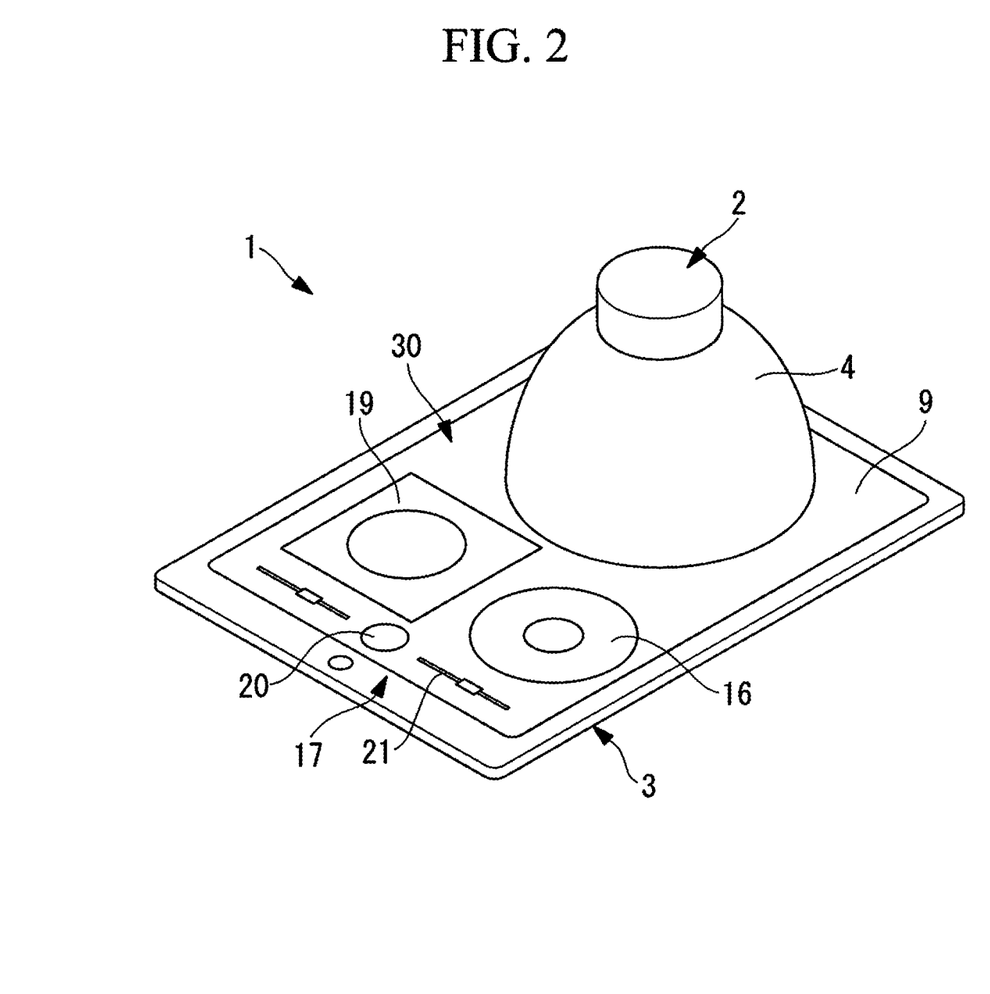
FIG. 2 is a perspective view of the image acquisition system in FIG. 1.

As shown in FIG. 1 and FIG. 2, the image acquisition system 1 according to the embodiment includes a photographing device 2, a display device 3 and a support member (reflective member) 4 that disposes the photographing device 2 in a simplified positioning state with respect to the display device 3.

The photographing device 2 includes an imaging unit 5 that photographs a subject P, a memory 6 that stores an image acquired by the imaging unit 5, a communication unit (sending unit) 7 that sends the image stored in the memory 6 and that receives a signal from the display device 3, and a control unit 8 that controls them. The imaging unit 5 includes a lens and an imaging element, which are not illustrated.

The control unit 8 controls the photographing of the subject P by the imaging unit 5, the reading of the image recorded in the memory 6, and the sending and receiving of the image by the communication unit 7.

The display device 3, for example, is a general-purpose tablet-type device, and includes a flat display surface 9 that is configured by a liquid crystal display, a communication unit (receiving unit) 10 that receives the image sent from the photographing device 2 and that sends a signal to the photographing device 2, a processor, and a memory (storage unit) 12.

As shown in FIG. 1, the communication units 7, 10 transfer the image by way of a server 14 via a network 13, by wireless transmission. In the figure, reference numeral 15 denotes a router.

As the network 13, an arbitrary network, such as the internet and an intranet, may be employed. Further, without the network 13, the transfer may be directly performed through short-range communication or wireless communication, or through a portable memory device, such as a memory card or a USB memory, and alternatively, the communication may be directly performed by PtoP (Peer to Peer). The dotted arrow in FIG. 1 shows the transmission of the image in the case of the direct communication between the two communication units 7, 10.

Figure 3:
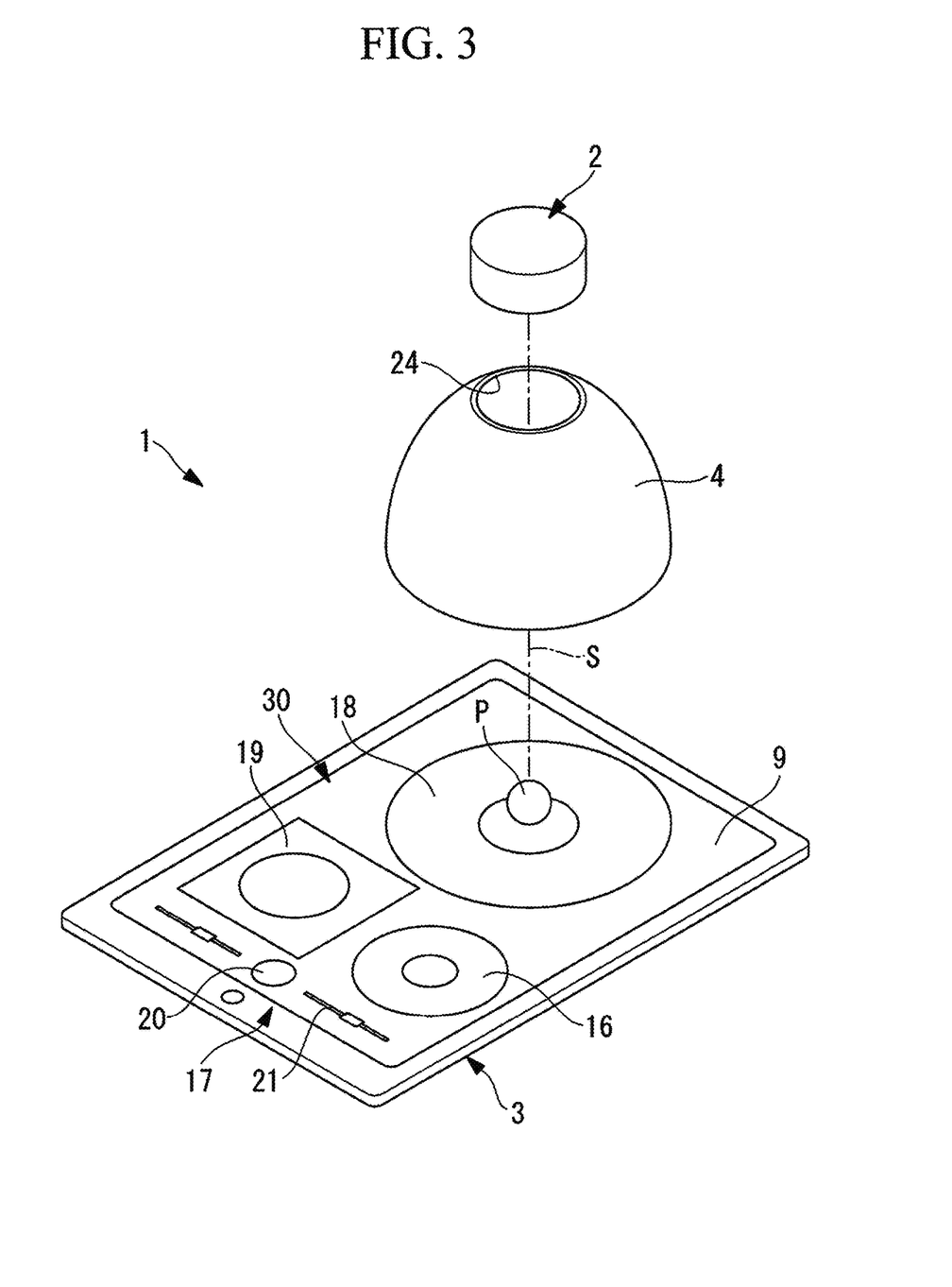
FIG. 3 is an exploded perspective view of the image acquisition system in FIG. 1.

In the display device 3, the processor executes the application software stored in the memory 12, and thereby, a display control unit 11 that controls display contents on the display surface 9 is configured by the processor. As shown in FIGS. 2 and 3, on the display surface 9, a display unit 30, an editor unit 16, and an operation input unit 17 are displayed.

The display unit 30 includes an illumination region 18 at which the subject P is placed and the subject P is illuminated, and a display region 19 at which the image acquired by the photographing device 2 is displayed. The editor unit 16 is a part through which an operator edits an image (illumination image) that is displayed on the illumination region 18. The operation input unit 17 displays interfaces for photographing instruction (release) and adjustment, as a button 20 and slide bars 21 that are GUIs.

The image received by the communication unit 10 and the image edited by the editor unit 16 are stored in the memory 12, and are sent to the display control unit 11 configured by the processor. Further, the input performed on the operation input unit 17 is also sent to the display control unit 11. The display control unit 11 displays the image sent from the memory 12, on the illumination region 18, in accordance with the instruction input by the operation input unit 17, for example, the instruction of the brightness of the image.

Figure 4:
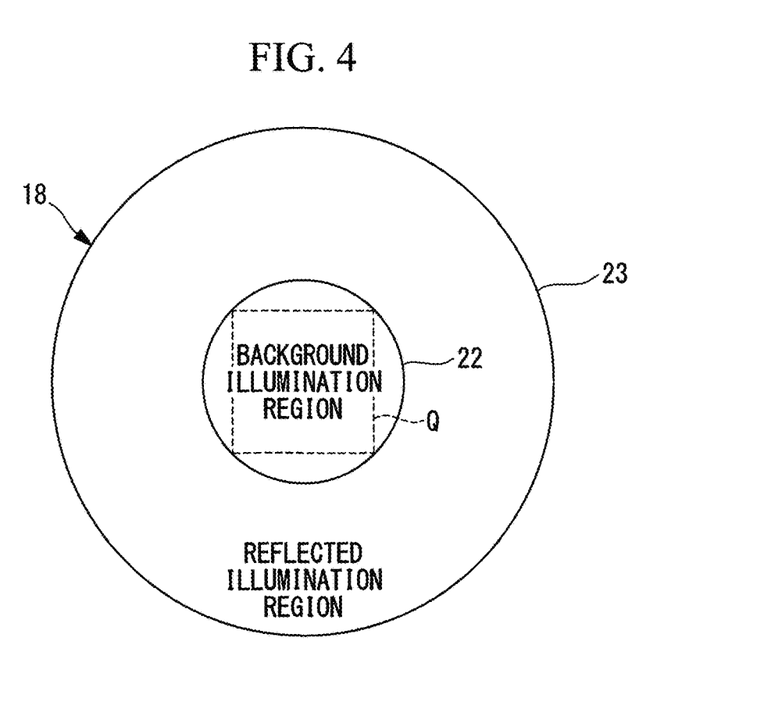
FIG. 4 is a diagram showing an illumination region that is provided on a display device of the image acquisition system in FIG. 1.

As shown in FIG. 4, the illumination region 18 includes a background illumination region 22 at the center, at which the subject P is placed, and a toroidal reflected illumination region 23 disposed at the periphery.

Figure 5:
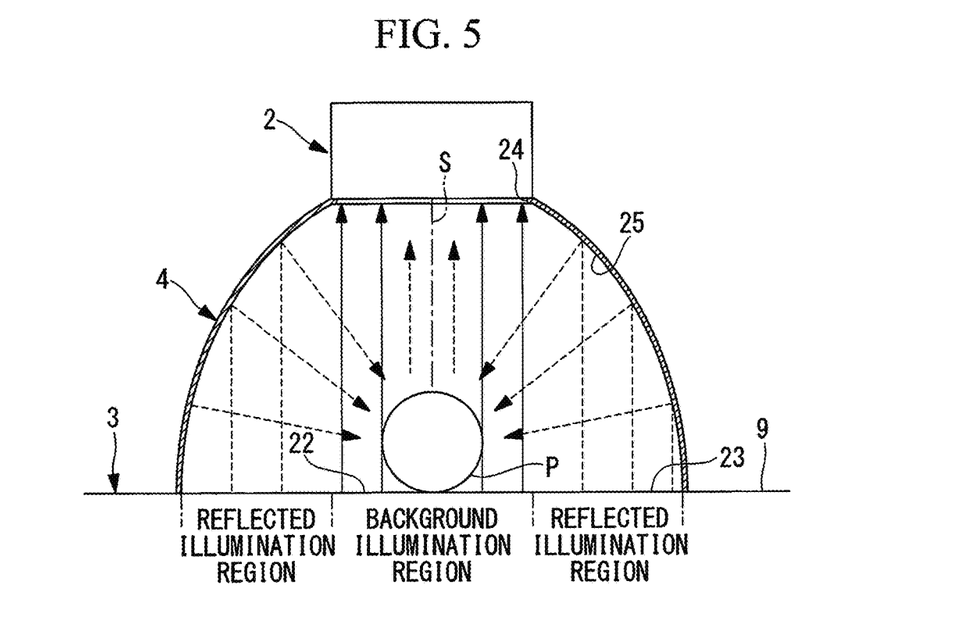
FIG. 5 is a vertical cross-sectional view for describing the light reflection within a support member of the image acquisition system in FIG. 1.

As shown in FIG. 2, FIG. 3 and FIG. 5, the support member 4 is a dome-shaped hollow member that is placed on the illumination region 18 of the display surface 9, has a through-hole 24 that passes between the interior and the exterior, and has a reflective surface 25 on the inner surface. An edge part of the support member 4 that contacts with the display surface 9 has a diameter nearly equivalent to that of the outer shape of the illumination region 18.

That is, when the support member 4 is disposed at a position corresponding to the illumination region 18 of the display device 3 that is horizontally disposed while the display surface 9 is oriented upward, the support member 4 is disposed so as to cover the whole of the reflected illumination region 23 of the illumination region 18. When the subject P is placed on the background illumination region 22, the subject P is surrounded by the display surface 9 and the inner surface of the support member 4.

Further, since the through-hole 24 is disposed at an upper part of the support member 4 placed on the display surface 9, it is possible to photograph the interior of the support member 4 by the photographing device 2, by placing the photographing device 2 such that an optical axis S is disposed vertically downward via the through-hole 24. When the photographing device 2 is disposed in this way, an angular field Q of the photographing device 2 is disposed within the background illumination region 22, as shown by the broken line in FIG. 4.

As for the light radiated from the background illumination region 22 of the illumination region 18, the light not blocked by the subject P, as shown in FIG. 5, passes through the through-hole 24 of the support member 4, directly enters the photographing device 2, and configures the background of the subject P on the image to be acquired. Further, the light radiated from the reflected illumination region 23 of the illumination region 18 is reflected by the reflective surface 25 disposed at an upper part, is oriented in the direction of the subject P, is reflected by the surface of the subject P again, passes through the through-hole 24 of the support member 4, and enters the photographing device 2. Thereby, the light from the reflected illumination region 23 configures the illumination that is mirrored on the surface of the subject P on the image to be acquired.

As the image to be displayed on the illumination region 18, images shown in FIG. 6A to FIG. 6H can be shown as examples.

In the image examples, the background image is an image that is directly photographed as the background of the subject P by the photographing device 2, and an arbitrary image can be displayed.

Figure 6A:
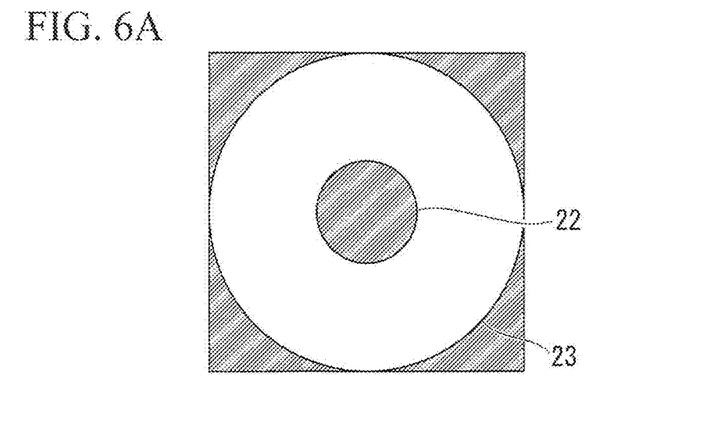
FIG. 6A is a diagram showing a first image example that is displayed on the illumination region in FIG. 4.

FIG. 6A shows an image in which the whole of the reflected illumination region 23 has a uniform and high luminance.

Figure 6B:
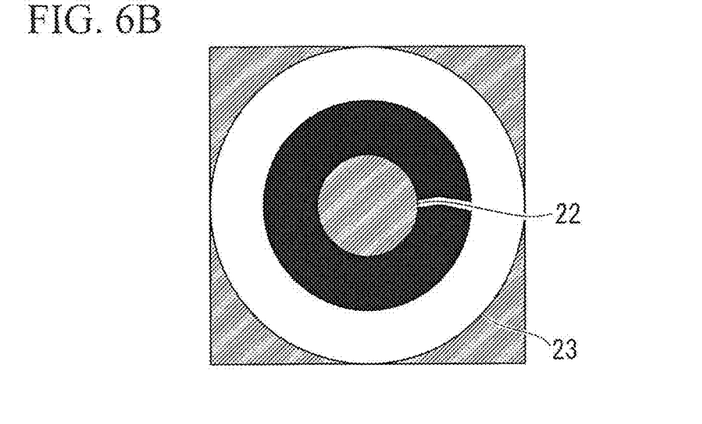
FIG. 6B is a diagram showing a second image example that is displayed on the illumination region in FIG. 4.

FIG. 6B shows an image in which the radially outer half of the reflected illumination region 23 has a uniform and high luminance and the radially inner half has a low luminance (for example, a luminance of zero). By displaying this image, it is possible to illuminate the subject P from lower positions as shown in FIG. 5 and brightly illuminate the circumference of the subject P on the image to be acquired.

Figure 6C:
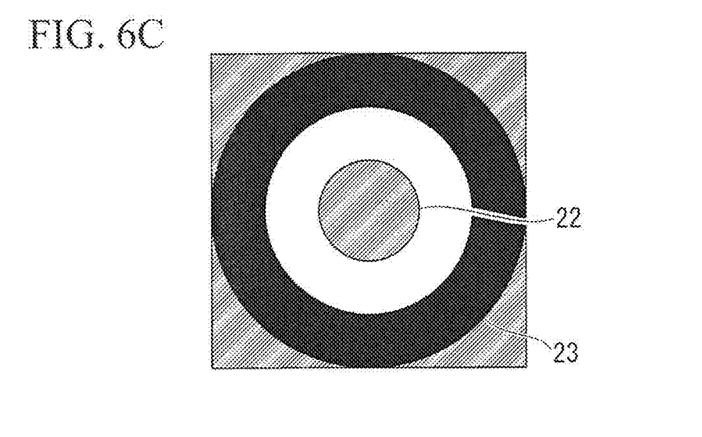
FIG. 6C is a diagram showing a third image example that is displayed on the illumination region in FIG. 4.

Meanwhile, FIG. 6C shows an image in which the radially outer half of the reflected illumination region 23 has a uniform and high luminance and the radially inner half has a low luminance (for example, a luminance of zero). By displaying this image, it is possible to illuminate the subject P from higher positions as shown in FIG. 5 and brightly illuminate the vicinity of the center of the subject P on the image to be acquired.

Figure 6D:
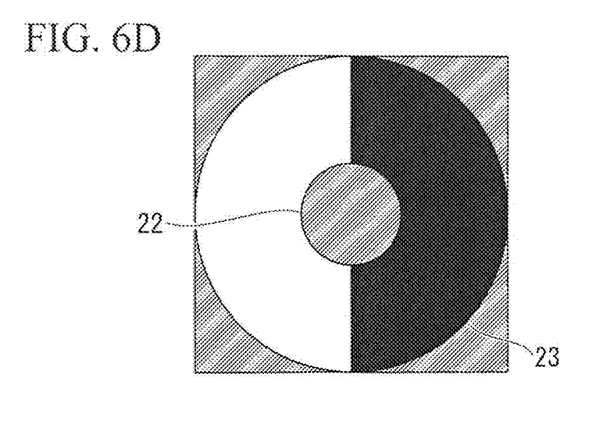
FIG. 6D is a diagram showing a fourth image example that is displayed on the illumination region in FIG. 4.

FIG. 6D is an image in which a semicircle of the reflected illumination region 23 has a uniform and high luminance and the other semicircle has a low luminance. The circumferential positions of the high-luminance region and low-luminance region can be arbitrarily set. By displaying this image, it is possible to brightly illuminate a circumferential half of the subject P and darkly illuminate the other half.

Figure 6E:
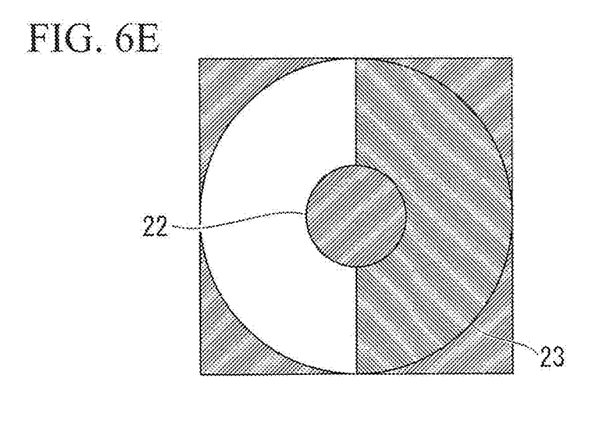
FIG. 6E is a diagram showing a fifth image example that is displayed on the illumination region in FIG. 4.

FIG. 6E shows an image in which the high-luminance region in FIG. 6D is replaced with a middle-luminance region.

Figure 6F:
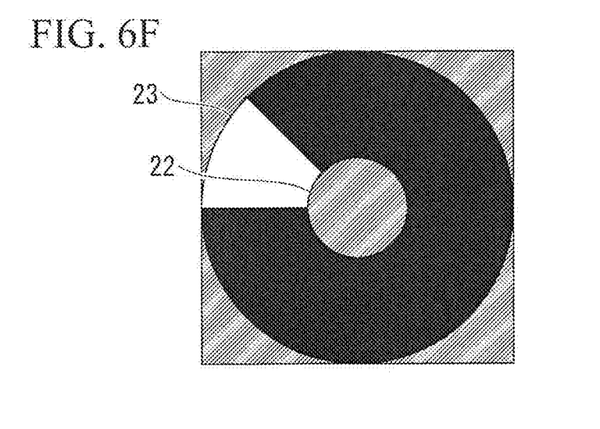
FIG. 6F is a diagram showing a sixth image example that is displayed on the illumination region in FIG. 4.

FIG. 6F shows an image in which a part in the circumferential direction of the reflected illumination region 23 has a uniform and high luminance and the other part has a low luminance. The circumferential position of the high-luminance region can be arbitrarily set.

Figure 6G:
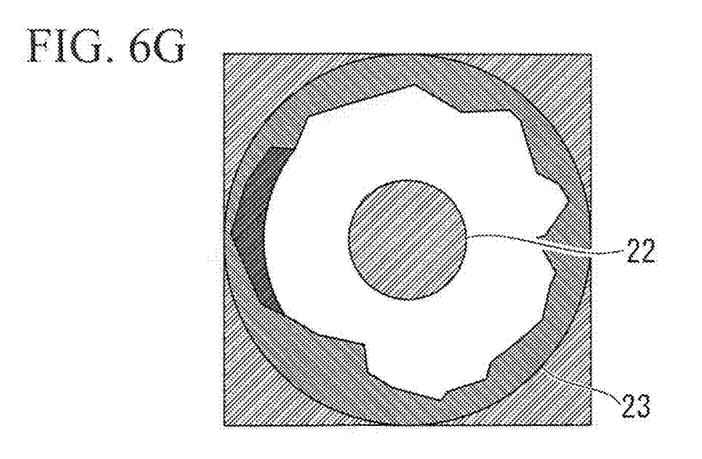
FIG. 6G is a diagram showing a seventh image example that is displayed on the illumination region in FIG. 4.

FIG. 6G shows an image in which a texture image is displayed on the reflected illumination region 23. The texture image is inverted by the reflective surface 25 of the support member 4, and is mirrored on the subject P.

Figure 6H:
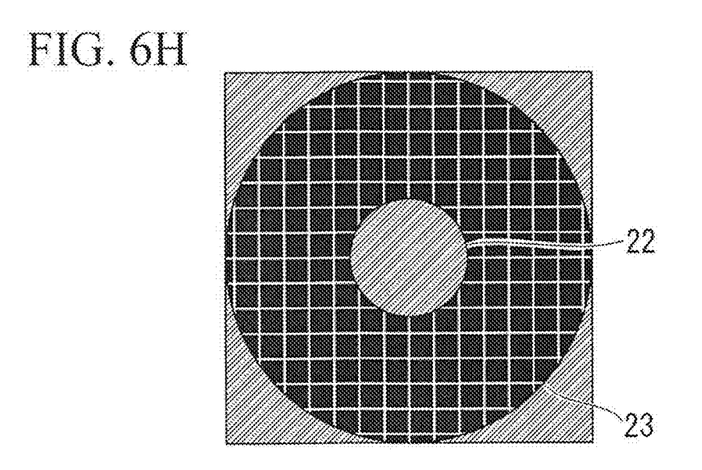
FIG. 6H is a diagram showing an eighth image example that is displayed on the illumination region in FIG. 4.

FIG. 6H shows an image in which a grid pattern image is displayed on the reflected illumination region 23. By mirroring the grid pattern on the surface of the subject P, it is possible to acquire an image in which the surface shape of the subject P is easily detected.

In the following, the operation of the image acquisition system 1 according to the embodiment configured in this way will be described.

For photographing the subject P using the image acquisition system 1 according to the embodiment, as shown in FIG. 3, the display device 3 is placed at a flat location while the display surface 9 is oriented upward, and the application software is activated. After the application software is activated, the illumination region 18, the display region 19, the editor unit 16 and the operation input unit 17 are displayed on the display surface 9.

For example, an initial image stored in the memory 12 is displayed on the illumination region 18. For example, the initial image is an image in which the whole of the reflected illumination region 23 of the illumination region 18 emits light at a uniform luminance, as shown in FIG. 6A.

The subject P is disposed on the background illumination region 22 at the center of the illumination region 18 displayed on the display surface 9, and the support member 4 is disposed so as to cover the whole of the reflected illumination region 23. Then, as shown in FIG. 2, the photographing device 2 is disposed while the optical axis S is oriented vertically downward, to close the through-hole 24 provided on the support member 4. Thereby, the angular field Q of the imaging unit 5 is set within the background illumination region 22, as shown by the broken line in FIG. 4. In this state, the photographing device 2 is activated.

Thereby, a preview image is acquired by the imaging unit 5 of the photographing device 2. The acquired preview image is stored in the memory 6 by the actuation of the control unit 8, and then, is sent to the display device 3 via the network 13 by the communication unit 7. The sent preview image is received by the communication unit 10 of the display device 3, is stored in the memory 6, and then is displayed on the display region 19 of the display surface 9 by the display control unit 11.

Since the angular field Q of the imaging unit 5 is disposed within the background illumination region 22 and the subject P is placed on the background illumination region 22, the image to be acquired by the imaging unit 5 is an image in which the subject P is disposed at the center and a part of the image of the background illumination region 22 is disposed at the periphery. Further, since the reflected illumination region 23 disposed outside the background illumination region 22 is not contained in the angular field Q of the imaging unit 5, the light from the reflected illumination region 23 does not directly enter the imaging unit 5. However, as shown in FIG. 5, the light from the reflected illumination region 23 is reflected by the reflective surface 25 disposed on the inner surface of the support member 4, is irradiated to the subject P, is reflected by the surface of the subject P, and then enters the imaging unit 5. Therefore, the light from the reflected illumination region 23 is photographed so as to be mirrored on the surface of the subject P.

That is, the image acquisition system 1 according to the embodiment has an advantage that the illumination for the background of the subject P and the illumination to be mirrored on the subject P can be simultaneously performed by the image to be displayed on the illumination region 18 of the display device 3, which is a simple display device such as a general-purpose tablet-type device.

Further, the embodiment has an advantage that it is possible to easily give different illumination effects to the subject P simply by selecting the image to be displayed on the illumination region 18 as shown in FIG. 6A to FIG. 6H.

In the embodiment, the router 15 is used for wireless transmission, but instead of this, a wireless access point may be used.

As the image to be displayed on the illumination region 18, an image stored in the memory 12 may be alternatively read and displayed, or an original image edited by the editor unit 16 may be displayed.

The inner surface of the support member 4, which is adopted as the reflective surface 25 in the embodiment, may be a mirror surface, a glossy surface or a diffusing surface, specifically, and the reflectance of this surface may be high or may be low. Furthermore, a pattern in which they are appropriately combined may be formed. In each case, the light from the reflected illumination region 23 can be reflected and can be mirrored on the subject P.

Figure 7:
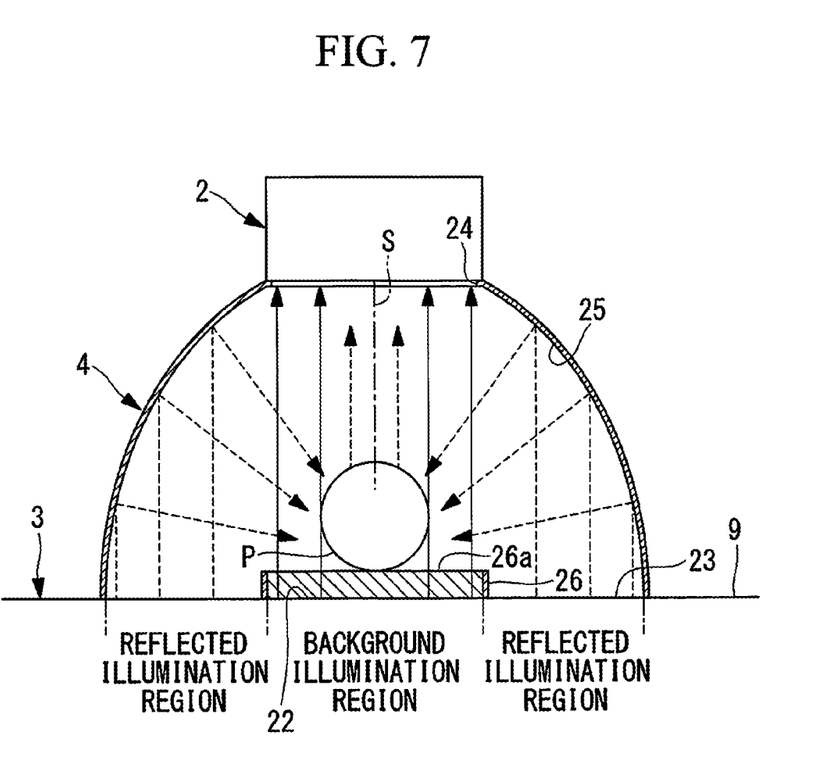
FIG. 7 is a vertical cross-sectional view showing a modification of the image acquisition system in FIG. 5.

In the embodiment, as shown in FIG. 7, a shielding member 26 that performs the demarcation between the background illumination region 22 and the reflected illumination region 23 may be provided. In the example shown in FIG. 7, the shielding member 26 is configured by coating the whole of the peripheral surface of a discoid glass plate 26a that is formed so as to have nearly the same size as the background illumination region 22 and on which the subject P is placed, with a light-shielding material.

By providing such a shielding member 26, it is possible to prevent the light from the background illumination region 22 from mixing with the light to be mirrored on the surface of the subject P, and prevent the light from the reflected illumination region 23 from influencing the background illumination region 22, by the shielding member 26.

As a result, the above-described embodiment leads to the following aspect.

An aspect of the present invention is directed to an image acquisition system including: a display device that includes a display surface on which an image is displayed; a dome-shaped reflective member that is disposed so as to cover at least a part of the display surface of the display device, that includes a reflective surface reflecting light from the display surface, on an inner surface, and that has a through-hole that passes between an interior and an exterior; and a photographing device that photographs light radiated from the display surface via the through-hole, while a subject is disposed at a position between the reflective member and the display surface.

According to the aspect, when the light radiated from the display surface is photographed by the photographing device via the through-hole that passes through the reflective member while the subject is disposed between the display device and the reflective member, the light from the display surface disposed inside the angular field of the photographing device is directly photographed and thereby is acquired as a background image of the subject. On the other hand, the light radiated from the display surface disposed outside the angular field of the photographing device is reflected by the reflective surface disposed on the inner surface of the dome-shaped reflective member, is irradiated to the subject and then is photographed by photographing device as a reflected light on the surface of the subject. As a result, both the illumination from the background side of the subject and the illumination from the front side can be performed by the display device disposed on the background side of the subject, and an image different from the background image can be projected to the subject in a simple configuration.

In the above aspect, the photographing device may include a sending unit that sends an acquired image, and the display device may include: an illumination region that emits illumination light; a receiving unit that receives the image sent by the sending unit; and a display region that displays the image received by the receiving unit.

By doing so, a user can check the condition of the illumination because the photographing device sends the acquired image by the sending unit, the display device receives the sent image by the receiving unit and displays the image on the display region. Since a part of the display device is used as the display region, a separate display device is unnecessary, allowing for the simplification of the configuration.

In the above aspect, the display device may include: an editor unit that enables a user to set an illumination image to be displayed on the illumination region; and a display control unit that displays the illumination image set by the editor unit, on the illumination region.

By doing so, the user can easily change illumination effect to perform photographing, by arbitrarily setting the illumination image to be displayed on the illumination region, using the editor unit provided in the display device, and displaying the illumination image by the display control unit.

In the above aspect, the display device may include: a storage unit that stores a plurality of illumination images to be displayed on the illumination region; and a display control unit that displays one of the illumination images stored in the storage unit, on the illumination region, in an alternatively switching manner.

By doing so, it is possible to easily change the illumination effect to perform photographing, because the display control unit alternatively switches the plurality of illumination images previously stored in the storage unit and displays the illumination images on the illumination region.

In the above aspect, the illumination region may include: a background illumination region that is disposed at a position containing an angular field of the photographing device and at which the subject is disposed; and a reflected illumination region that is disposed around the background illumination region.

By doing so, for the image acquired by the photographing device, the light from the background illumination region inside the angular field is directly photographed as background illumination light, and the light from the reflected illumination region outside the angular field is reflected by the reflective surface of the reflective member and is irradiated to the subject as the illumination light from the front side of the subject. Thereby, it is possible to irradiate both the background illumination for the subject and the illumination from the front side, by an image displayed on a single illumination region.

In the above aspect, the image acquisition system may include a shielding member that demarcates a boundary between the background illumination region and the reflected illumination region.

By doing so, because of the shielding member, it is possible to prevent the illumination light from the background illumination region from mixing with the illumination light from the front side and prevent the illumination light from the reflected illumination region from influencing the background illumination region.

The present invention exerts an effect of being able to project an image different from a background image, to a subject, in a simple configuration.

REFERENCE SIGNS LIST 1 image acquisition system
2 photographing device
3 display device
4 support member (reflective member)
7 communication unit (sending unit)
9 display surface
10 communication unit (receiving unit)
11 display control unit
12 memory (storage unit)
16 editor unit
18 illumination region
19 display region
22 background illumination region
23 reflected illumination region
24 through-hole
25 reflective surface
26 shielding member
P subject
Q angular field

The invention claimed is:

1. An image acquisition system comprising:
a display device that includes a display surface on which an image is displayed;
a dome-shaped reflective member that is disposed so as to cover at least a part of the display surface of the display device, that includes a reflective surface reflecting light from the display surface, on an inner surface thereof, and that has a through-hole that passes between an interior and an exterior; and
a photographing device that photographs light radiated from the display surface via the through-hole, while a subject is disposed at a position between the reflective member and the display surface.

2. The image acquisition system according to claim 1, wherein
the photographing device includes a sending unit that sends an acquired image, and
the display device includes: an illumination region that emits illumination light; a receiving unit that receives the image sent by the sending unit; and a display region that displays the image received by the receiving unit.

3. The image acquisition system according to claim 2, wherein the display device includes: an editor unit that enables a user to set an illumination image to be displayed on the illumination region; and a display control unit that displays the illumination image set by the editor unit, on the illumination region.

4. The image acquisition system according to claim 2, wherein the display device includes: a storage unit that stores a plurality of illumination images to be displayed on the illumination region; and a display control unit that displays one of the illumination images stored in the storage unit, on the illumination region, in an alternatively switching manner.

5. The image acquisition system according to claim 2, wherein the illumination region includes: a background illumination region that is disposed at a position containing an angular field of the photographing device and at which the subject is disposed; and a reflected illumination region that is disposed around the background illumination region.

6. The image acquisition system according to claim 5, comprising a shielding member that demarcates a boundary between the background illumination region and the reflected illumination region.

* * * * *